United States Patent Office 2,705,725
Patented Apr. 5, 1955

2,705,725

1 - HYDROXYMETHYL - 1,12 DIMETHYL - 6 - HYDROXY 1,2,3,4,9,10,11,12 - OCTAHYDRO-9-PHENANTHRONE AND DERIVATIVES THEREOF

Roy H. Bible, Jr., Chicago, and Willard M. Hoehn, Wilmette, Ill., assignors to G. D. Searle & Co., Chicago, Ill., a corporation of Illinois No Drawing. Application September 14, 1953, Serial No. 380,095

9 Claims. (Cl. 260—488)

The present invention relates to a new group of 9-phenanthrones and, more particularly, to 1-hydroxymethyl - 1,12 - dimethyl - 6 - hydroxy - 1,2,3,4,9,10,11,12-octahydro-9-phenanthrone and its O-substitution products. These compounds can be represented by the structural formula

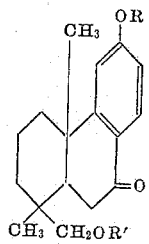

wherein R is a member of the class consisting of hydrogen and lower alkyl radicals and R′ is a member of the class consisting of hydrogen, lower alkyl, lower phenylalkyl, benzoyl and (lower alkyl)-CO— radicals. Among the suitable lower alkyl radicals are methyl, ethyl, straight and branched chain propyl, butyl, amyl and hexyl and among the suitable lower phenylalkyl radicals are benzyl, phenethyl, phenylpropyl and the like.

For the preparation of the claimed compounds in which the 1-hydroxymethyl radical is esterified or etherified we prefer to treat a solution of the corresponding 9-desoxo compound of the formula

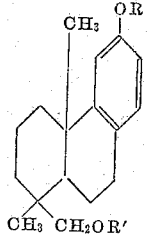

in a solvent such as acetic acid with chromic acid at a temperature between 0 and 25° centigrade. The resulting ethers and esters can be deetherified and deesterified by conventional methods and the resulting free hydroxy groups can be reetherified and reesterified with other radicals.

For the preparation of the free 1-hydroxymethyl compounds (in which R′ in the above formula is hydrogen) an alternative procedure is also useful. An ester of the type

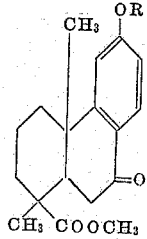

is prepared by the method of our copending application Serial Number 347,165, filed April 6, 1953 by oxidation with chromic acid in acetic acid of the corresponding 9-desoxo compounds in which the 6-hydroxy group is protected by an ether or ester group. This 9-keto ester is converted to the ketal of the type

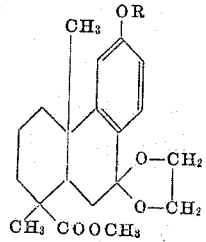

by treatment with a slight excess of ethylene glycol and a catalytic amount of p-toluenesulfonic acid in benzene and azeotropic distillation. The resulting ketal is reduced with lithium aluminum hydride to yield a compound of the type

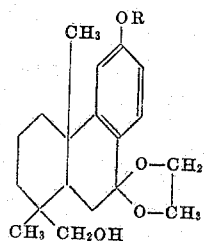

which on cleavage, e. g., with aqueous ethanol and a trace of hydrochloric acid, yields a compound of the type

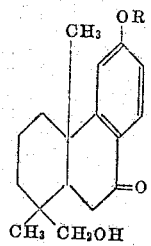

The compounds of our invention are valuable hormonal and anabolic agents. Among their important properties is their androgenic effect. These phenanthrones are of further utility as intermediates for the preparation of other medicinal substances. Thus, the 9-oxo group can be converted to a hydroxy group by hydrogenation over a noble metal catalyst such as platinum oxide. Various ketonic reagents such as hydrogen cyanide can be added to the keto group. In those of the claimed compositions in which neither R nor R′ represents hydrogen, substituents can be introduced into the 7-position by Friedel-Crafts type reactions. A Friedel-Crafts reaction employing acrylyl chloride yields compounds such as

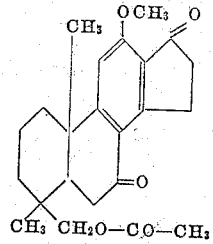

which have the steroidal skeleton. Nitrogenous substituents are introduced at the 7-position of the claimed compounds by nitration with nitric acid in acetic acid.

After blocking of the 7-position, e. g., by acetylation by a Friedel-Crafts reaction, the carbon atom in the 5-position can be made to undergo aromatic substitution reactions such as nitration and Friedel-Crafts type reactions.

Treatment of the claimed 1-hydroxymethyl-1,12-dimethyl-6-alkoxy-1,2,3,4,9,10,11,12-octahydro-9-phenanthrones with sodium yields the sodio derivative which, on treatment with lower dialkylaminoalkyl halides yields ethers of the type

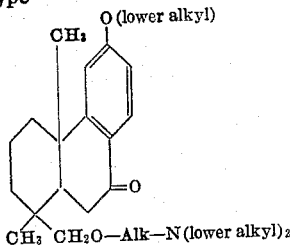

wherein Alk is a lower alkylene radical separating the oxygen and nitrogen atoms attached thereto by at least two carbon atoms.

Our invention is disclosed in further detail by the following examples which are set forth for the purpose of illustrating the invention, but are in no way to be construed as limiting it in spirit or in scope. It will be apparent to those skilled in the art that numerous modifications in methods, conditions, and materials can be adopted without departing therefrom. In each of these examples, quantities of materials are indicated as parts by weight, and temperatures are given uncorrected in degrees centigrade (° C.).

Example 1

To a solution of 20 parts of O-methylpodocarpinol in 50 parts of hot acetic anhydride, 1 part of acetyl chloride is added and the mixture is heated on a steam bath for 20 minutes. It is then cooled and poured into a large volume of cold water. The mixture is stirred until the acetate solidifies. The solid is collected on a filter and recrystallized from aqueous isopropanol to yield the 1-acetoxymethyl-1,12-dimethyl-6-methoxy - 1,2,3,4,9,10,11,12-octahydrophenanthrene which melts at about 75–76° C.

Example 2

To a well-stirred solution of 27 parts of 1-acetoxymethyl-1,12-dimethyl-6-methoxy - 1,2,3,4,9,10,11,12-octahydrophenanthrene in 2000 parts of glacial acetic acid is added slowly a solution of 18.6 parts of chromic acid in a mixture of 33 parts of acetic acid and 8.4 parts of water. The reaction mixture is maintained at 8–11° C. during this addition. Stirring is continued while the mixture is maintained at about 5° C. for 1 hour after the addition is completed. The mixture is then stored at 5° C. for 24 hours and finally at room temperature for 10 days. The excess chromic acid is decomposed by the addition of a small amount of ethanol. The reaction mixture is then diluted with water and extracted with ether. This extract is washed successively with 10% aqueous sodium hydroxide solution, 10% hydrochloric acid solution and finally with water until the washings are neutral. The ether solution is then dried over anhydrous sodium sulfate, filtered, and evaporated under vacuum to yield a light yellow oil which crystallizes on standing. Successive recrystallizations from aqueous isopropanol and then from aqueous acetic acid yield 1-acetoxymethyl-1,12-dimethyl-6-methoxy-1,2,3,4,9,10,11,12 - octahydro - 9-phenanthrone as white crystals melting at about 112–113° C. The ultraviolet absorption spectrum of this compound has maxima at 226 and 278 millimicrons with molecular extinction coefficients of 12,700 and 15,000 respectively. The infrared absorption spectrum has bands at 5.79, 6.02, 6.27, 6.38, 6.75, 6.85 and 7.29 microns. The compound has the structural formula

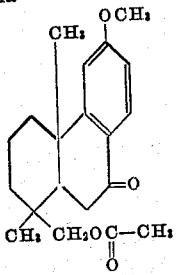

Example 3

A solution of 10 parts of potassium hydroxide and 10 parts of 1 - acetoxymethyl - 1,12 - dimethyl-6-methoxy-1,2,3,4,9,10,11,12-octahydro-9-phenanthrone in 10 parts of water and 40 parts of 95% ethanol is refluxed for 2 hours. The mixture is cooled, diluted with water, and extracted with ether. This extract is washed with water until the washings are neutral. The washed solution is dried over anhydrous sodium sulfate, filtered and evaporated under vacuum to yield a light yellow, viscous oil. The 1-hydroxymethyl-1,12-dimethyl-6-methoxy-1,2,3,4,9,10,11,12-octahydro - 9 - phenanthrone thus obtained displays maxima at 227 and 278 millimicrons in the ultraviolet region and at 2.76 and 6.02 microns in the infrared. It has the structural formula

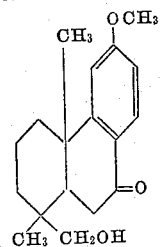

The identical product is prepared by the following method. A solution of 100 parts of methyl O-methylpodocarpate in 1050 parts of hot glacial acetic acid is stirred and cooled to 17° C. and treated at that temperature, by slow addition, with 72 parts of chromic anhydride in 166 parts of 80% acetic acid in the course of 30 minutes. Stirring is continued for another 10 minutes after which the mixture is stored at 5° C. for 3 days and then at room temperature for 2 days. It is then poured with stirring into 1000 parts of ice cold water and extracted with ether. The ether extract is washed with 10% aqueous sodium hydroxide until the washings are no longer colored and then with water to neutrality. The washed ether solution is dried over anhydrous calcium sulfate, filtered and stripped of solvent under vacuum. The slightly yellow solid residue is recrystallized twice from aqueous ethanol to yield clusters of beautiful white prisms melting at about 122–124° C. A benzene solution of the methyl ester of 1,12-dimethyl - 6 - methoxy-9-oxo-1,2,3,4,9,10,11,12-octahydrophenanthrene - 1 - carboxylic acid thus obtained is treated with 1.1 equivalents of ethylene glycol and a trace of p-toluenesulfonic acid and submitted to azeotropic distillation. A solution of 80 parts of the resulting ketal in 150 parts of benzene is added gradually to a stirred solution of 30 parts of lithium aluminum hydride in 400 parts of anhydrous ether. The resulting mixture is stirred at reflux temperature for 80 hours and the volume of solvent lost is replaced by benzene. The excess hydride is decomposed by addition of ethyl acetate. Then, water is added with stirring until a precipitate forms. The clear organic supernatant liquid is separated and the precipitate is washed with ether. The combined organic solutions are shaken with small amounts of 10% aqueous potassium hydroxide, washed with water to neutrality, dried over anhydrous calcium sulfate and evaporated under vacuum. The residue contains the ketal of the 1 - hydroxymethyl-1,12-dimethyl-6-methoxy-1,2,3,4,9, 10,11,12-octahydro-9-phenanthrone. The free 9-oxo compound is obtained by heating an aqueous alcoholic solution of the ketal at reflux with 2 equivalents of pyruvic acid and 0.1 equivalents of hydrochloric acid.

Example 4

A solution of 302 parts of the methyl ester of 1,12-dimethyl-6-hydroxy-9 - oxo - 1,2,3,4,9,10,11,12-octahydrophenanthrene-1-carboxylic acid in 1000 parts of benzene is treated with 68.2 parts of 1,2-ethanediol in the presence of 5 parts of p-toluenesulfonic acid. The mixture is refluxed and the water formed is azeotroped until the reaction is complete. A solution of 400 parts of the ketal in 800 parts of benzene is added in the course of 20 minutes to a stirred solution of 150 parts of lithium aluminum hydride in 2000 parts of ether. The reaction mixture is agitated under reflux for 72 hours and the evaporated solvent is replaced with toluene. After decomposition of the excess of lithium aluminum hydride with ethyl acetate, water is added until precipitation occurs. The precipitate is separated and washed with ether and the combined organic solutions are washed with 10% aqueous sodium hydroxide and then with water, dried over anhydrous magnesium sulfate and evaporated under vacuum. The residue is dissolved in aqueous methanol and heated at reflux for one hour with 2 equivalents of pyruvic acid and 0.1 equivalent of concentrated hydrochloric acid. After cooling, the reaction mixture is washed with 10% aqueous hydrochloric acid and then with water to neutrality. The solution is dried over anhydrous sodium sulfate and is finally evaporated under vacuum. 1-hydroxymethyl-1,12-dimethyl-6-hydroxy - 1,2,3,4,9,10,11,12 - octahydro-9-phenanthrone is thus obtained as a light yellow, high-boiling, viscous oil which does not crystallize readily. This compound displays maxima at 227 and 279 millimicrons in the ultraviolet, and at 2.76 and 6.02 microns in the infrared spectrum. It has the structural formula

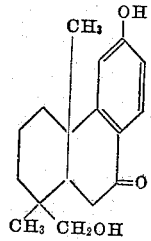

The same compound is also obtained by the following method. A mixture of 1-acetoxymethyl-1,12-dimethyl-6 - methoxy - 1,2,3,4,9,10,11,12 - octahydro - 9 - phenanthrone and 70 parts of freshly distilled pyridine hydrochloride is refluxed for 25 minutes under anhydrous conditions, cooled and diluted with water. The resulting mixture is acidified with dilute hydrochloric acid and extracted with ether. This extract is washed with water, dried over anhydrous calcium sulfate, filtered and evaporated under vacuum to yield the 1-acetoxymethyl-1,12-dimethyl - 6 - hydroxy - 1,2,3,4,9,10,11,12 - octahydro - 9-phenanthrone as a light orange, viscous, high-boiling oil. It has the structural formula

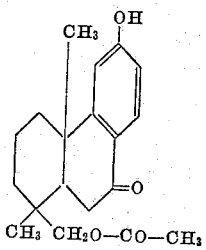

A solution of 10 parts of 1-acetoxymethyl-1,12-dimethyl - 6 - hydroxy - 1,2,3,4,9,10,11,12 - octahydro - 9-phenanthrone and 10 parts of potassium hydroxide in 10 parts of water and 40 parts of ethanol is refluxed for two hours. The reaction mixture is cooled, diluted with water, acidified with dilute hydrochloric acid, and extracted with ether. The ether solution is washed with water until the washings are neutral, dried over anhydrous sodium sulfate, filtered and evaporated in vacuo to yield 1 - hydroxymethyl - 1,12 - dimethyl - 6 - hydroxy-1,2,3,4,9,10,11,12-octahydro-9-phenanthrone as a light-yellow, viscous oil.

*Example 5*

A solution of 500 parts of 1-hydroxymethyl-1,12-dimethyl - 6 - methoxy - 1,2,3,4,9,10,11,12 - octahydro-9-phenanthrone and 176 parts of succinic anhydride in 2500 parts of pyridine is refluxed for one hour, cooled, diluted with cold water and slowly acidified with 10% hydrochloric acid. The resulting mixture is extracted with ether. This extract is washed with 10% hydrochloric acid and then with water to neutrality, dried over sodium sulfate, filtered and evaporated under vacuum. The resulting monosuccinate shows infrared absorption maxima at 5.78, 5.92 and 6.02 microns. It has the structural formula

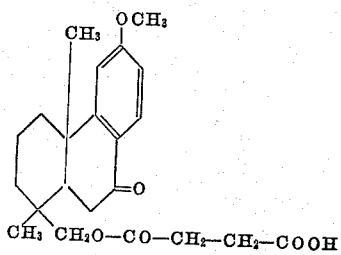

*Example 6*

A solution of 10 parts of O-methylpodocarpinol and 10 parts of benzoyl chloride in 25 parts of pyridine is heated at reflux for 1 hour. The mixture is cooled and diluted with water. The resulting 1-benzoyloxymethyl-6 - methoxy - 1,12 - dimethyl - 1,2,3,4,9,10,11,12 - octahydrophenanthrene is collected on a filter.

To a turbinated mixture of 120 parts of this ester in 4000 parts of glacial acetic acid maintained at 8-10° C. is added gradually a solution of 37.2 parts of chromic acid in 66 parts of acetic acid and 17 parts of water. Stirring is continued for one hour at 5° C., after which the mixture is stored at 0° C. for 36 and at 25° C. for 24 hours. Any excess of chromic acid is decomposed by the addition of a small amount of ethanol. The reaction mixture is diluted with water and extracted with ether. The extract is washed with 10% sodium hydroxide, 10% hydrochloric acid and then with water to neutrality. It is then dried over sodium sulfate and stripped under vacuum. The resulting 1-benzoyloxymethyl-1,12-dimethyl - 6 - methoxy - 9 - oxo - 1,2,3,4,9,10,11,12 - octahydrophenanthrene has ultraviolet maxima at 228 and 276 millicrons and infrared maxima at 5.86, 6.02, 7.85 and 9.0 microns. It has the structural formula

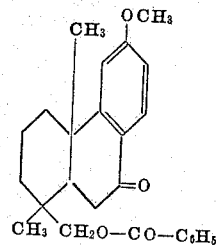

The same product is obtained in the following manner. A solution of 20 parts of 1-hydroxymethyl-1,12-dimethyl-6 - methoxy - 1,2,3,4,9,10,11,12 - octahydro - 9 - phenanthrone, 20 parts of benzoyl chloride and 50 parts of pyridine is refluxed for one hour. The mixture is cooled, diluted with water and extracted with ether. This extract is washed with dilute hydrochloric acid, dilute sodium hydroxide and then with water until the washings are neutral. The washed ether solution is dried over anhydrous calcium sulfate. After filtration of the drying agent and evaporation of the solvent under vacuum, the 1-benzoyloxy -1,12- dimethyl -6- methoxy-1,2,3,4,9,10,11,12-octahydro-9-phenanthrone is obtained as an almost colorless residue.

*Example 7*

A mixture of 10 parts of 1-benzoyloxymethyl-1,12-dimethyl - 6 - methoxy - 1,2,3,4,9,10,11,12 - octahydro-9-phenanthrone and 40 parts of freshly distilled pyridine hydrochloride is refluxed for 30 minutes under anhydrous conditions, cooled and then stirred with water. After acidification with 5% hydrochloric acid, the free phenol is taken up in chloroform and the chloroform solution is washed with water, dried over anhydrous sodium sulfate, filtered and evaporated to yield the 1-benzoyloxymethyl - 1,12 - dimethyl - 6 - hydroxy - 1,2,3,4,9,10,11,12-octahydro-9-phenanthrone. The infrared absorption spectrum shows maxima at 3.07, 5.92, and 6.01 microns and the ultra violet spectrum shows maxima at 228 and 281 millimicrons. The compound has the structural formula

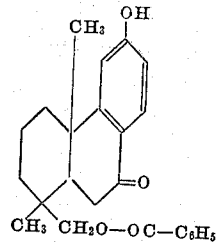

The same product can be obtained as follows. The above 1 - benzyloxymethyl - 1,12 - dimethyl - 6 - methoxy-1,2,3,4,9,10,11,12-octahydrophenanthrene is demethylated by refluxing with pyridine hydrochloride and the resulting 1-benzoyloxymethyl-1,12-dimethyl-6-hydroxy-1,2,3,4,9,10,11,12-octahydrophenanthrene is then oxidized to the 9-phenanthrone.

Example 8

A solution of 100 parts of O-methylpodocarpinol in 900 parts of toluene is stirred with 8.5 parts of sodium until all of the sodium has reacted. 100 parts of ethyl iodide are added and the mixture is refluxed for 4 hours, cooled, diluted with water and extracted with ether. The ether extract is washed with water until the washings are neutral, dried over anhydrous calcium sulfate, filtered and evaporated.

78 parts of the 1-ethoxymethyl-1,12-dimethyl-6-methoxy-1,2,3,4,9,10,11,12-octahydrophenanthrene thus obtained are dissolved in 6000 parts of glacial acetic acid. To the stirred solution, 57 parts of chromic acid in a mixture of 100 parts of acetic acid and 27 parts of water are added gradually while the temperature is maintained at 8° C. Stirring is continued for an hour at 5° C. The mixture is stored at 5° C. for 24 hours and then at 25° C. for 48 hours. The excess chromic acid is decomposed with a small quantity of ethanol and the reaction mixture is diluted with water and extracted with ether. This extract is washed with dilute sodium hydroxide, dilute hydrochloric acid and finally with water, dried over sodium sulfate and concentrated under vacuum. The 1-ethoxymethyl-1,12-dimethyl-6-methoxy-1,2,3,4,9,10,11,12-octahydro-9-phenanthrone is obtained as a faintly yellow, viscous oil. The infrared absorption spectrum shows maxima at 6.02, 6.27, and 6.77 microns. This diether has the structural formula

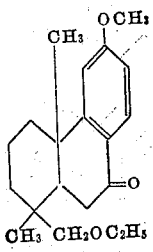

Example 9

A stirred mixture of 100 parts of 1-hydroxymethyl-6-methoxy-1,2,3,4,9,10,11,12-octahydro-9-phenanthrone and 8 parts of sodium in 1000 parts of dry toluene is heated until all of the sodium has reacted. Moisture is excluded during the entire reaction. The mixture is cooled and 43 parts of benzyl chloride are added all at once. Stirring is continued while the mixture is left unheated for an hour and then refluxed for an hour. After slow addition of 95 parts of ethanol, the mixture is cooled, diluted with water and extracted with ether. This extract is washed with water, dried over anhydrous magnesium sulfate, filtered and evaporated to yield the 1-benzyloxymethyl-6-methoxy-1,12-dimethyl-1,2,3,4,9,10,11,12-octahydro-9-phenanthrone as a clear glass. The infrared absorption spectrum shows maxima at 6.02, 6.27, 6.85, and 7.24 microns. The compound has the structural formula

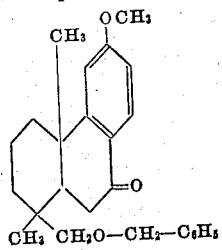

An alternative method of synthesis uses a reaction sequence analogous to that of the preceding example. A slurry of the sodio derivative of O-methylpodocarpinol in toluene solution is treated with benzyl chloride and the 1-benzoyloxymethyl-6-methoxy-1,12-dimethyl-1,2,3,4,9,10,11,12-octahydrophenanthrene is then oxidized to the 9-phenanthrone.

We claim:

1. A compound of the structural formula

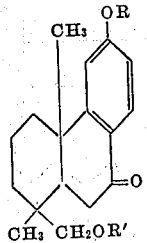

wherein R is a member of the class consisting of hydrogen and lower alkyl radicals and R' is a member of the class consisting of hydrogen and lower alkyl, lower phenylalkyl, benzoyl and (lower alkyl)-CO— radicals.

2. 1-hydroxymethyl-1,12-dimethyl-6-hydroxy-1,2,3,4,9,10,11,12-octahydro-9-phenanthrone.

3. A 1-hydroxymethyl-1,12-dimethyl-6-lower alkyloxy-1,2,3,4,9,10,11,12-octahydro-9-phenanthrone.

4. 1-hydroxymethyl-1,12-dimethyl-6-methoxy-1,2,3,4,9,10,11,12-octahydro-9-phenanthrone.

5. A compound of the structural formula

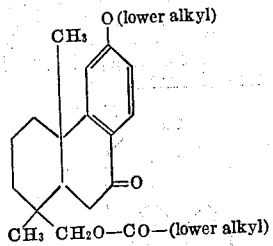

6. A compound of the structural formula

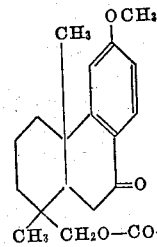

7. 1-acetoxymethyl-1,12-dimethyl-6-methoxy-1,2,3,4,9,10,11,12-octahydro-9-phenanthrone.

8. A 1-(lower alkyloxymethyl)-1,12-dimethyl-6-(lower alkyloxy)-1,2,3,4,9,10,11,12-octahydro-9-phenanthrone.

9. A 1-(lower alkyloxymethyl)-1,12-dimethyl-6-methoxy-1,2,3,4,9,10,11,12-octahydro-9-phenanthrone.

No references cited.